US011397625B2

United States Patent
France-Pillois et al.

(10) Patent No.: US 11,397,625 B2
(45) Date of Patent: Jul. 26, 2022

(54) LOCK MANAGER FOR MULTI-CORE ARCHITECTURES

(71) Applicant: Commissariat à l'Énergie Atomique et aux Énergies Alternatives, Paris (FR)

(72) Inventors: Maxime France-Pillois, Grenoble (FR); Jérôme Martin, Grenoble (FR); Eric Guthmuller, Grenoble (FR); Frédéric Rousseau, Grenoble (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 485 days.

(21) Appl. No.: 16/580,039

(22) Filed: Sep. 24, 2019

(65) Prior Publication Data
US 2020/0097336 A1 Mar. 26, 2020

(30) Foreign Application Priority Data

Sep. 26, 2018 (FR) ...................................... 1858803

(51) Int. Cl.
*G06F 9/46* (2006.01)
*G06F 9/52* (2006.01)
*G06F 9/448* (2018.01)
*G06F 9/54* (2006.01)

(52) U.S. Cl.
CPC ............ *G06F 9/526* (2013.01); *G06F 9/4498* (2018.02); *G06F 9/542* (2013.01)

(58) Field of Classification Search
CPC .......... G06F 9/526; G06F 9/4498; G06F 9/542
See application file for complete search history.

(56) References Cited

U.S. PATENT DOCUMENTS

| 8,086,579 B1 | 12/2011 | Chandrasekaran et al. |
| 2004/0093469 A1* | 5/2004 | Glasco ................ G06F 12/0815 711/119 |
| 2005/0216461 A1 | 9/2005 | Williams, Jr. et al. |

FOREIGN PATENT DOCUMENTS

| EP | 2 983 089 A1 | 2/2016 |
| WO | WO 2017/018976 A1 | 2/2017 |

OTHER PUBLICATIONS

Lozi et al, Fast and Portable locking for multicore archtiectures, ACM, 2016, 63 pages.*
Preliminary Search Report for French Application No. 1858803, dated Apr. 30, 2019.

(Continued)

*Primary Examiner* — Diem K Cao
(74) *Attorney, Agent, or Firm* — Wolf, Greenfield & Sacks, P.C.

(57) ABSTRACT

A multi-core architecture including: a plurality of processing devices, each processing device including a single processor or a cluster of processors; and a lock manager associated with each processing device, each lock manager being configured to: store a first data value indicating of whether or not it currently owns a first lock, the first lock authorizing access to a resource; and permit an owner of the first lock to be determined by one or more lock managers by broadcasting, over an interconnection network to each of the other lock managers, at least one message.

15 Claims, 6 Drawing Sheets

(56) References Cited

OTHER PUBLICATIONS

Kuo et al., MP-LOCKs: Replacing H/W Synchronization Primitived with Message Passing. IEEE Proceedings of the Fifth International Symposium on High-Performance Computer Architecture. Jan. 9, 1999:284-8).
Rutgers et al., An Efficient Asymmetric Distributed Lock for Embedded Multiprocessor Systems. IEEE 2012 International Conference on Embedded Computer Systems (SAMOS). Jul. 16, 2012:176-82).
FR1858803, Apr. 30. 2019, Preliminary Search Report.

* cited by examiner

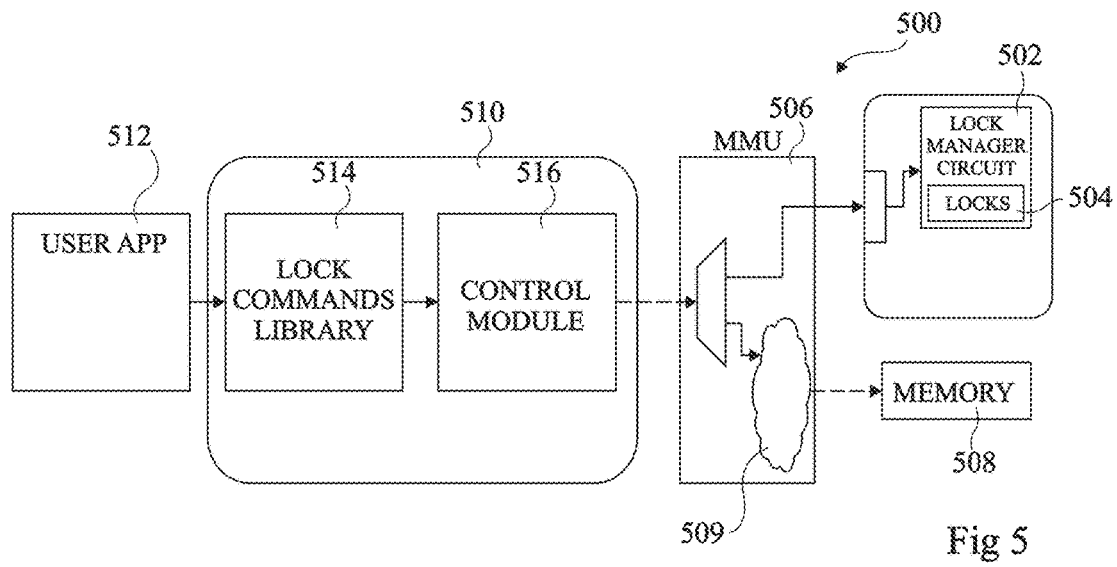
Fig 5
| OWNER | NEXT_CLUSTER | POINTER | WAITING | OLD | FAIRNESS COUNTER |
|---|---|---|---|---|---|
|  |  |  |  |  |  |
Fig 6
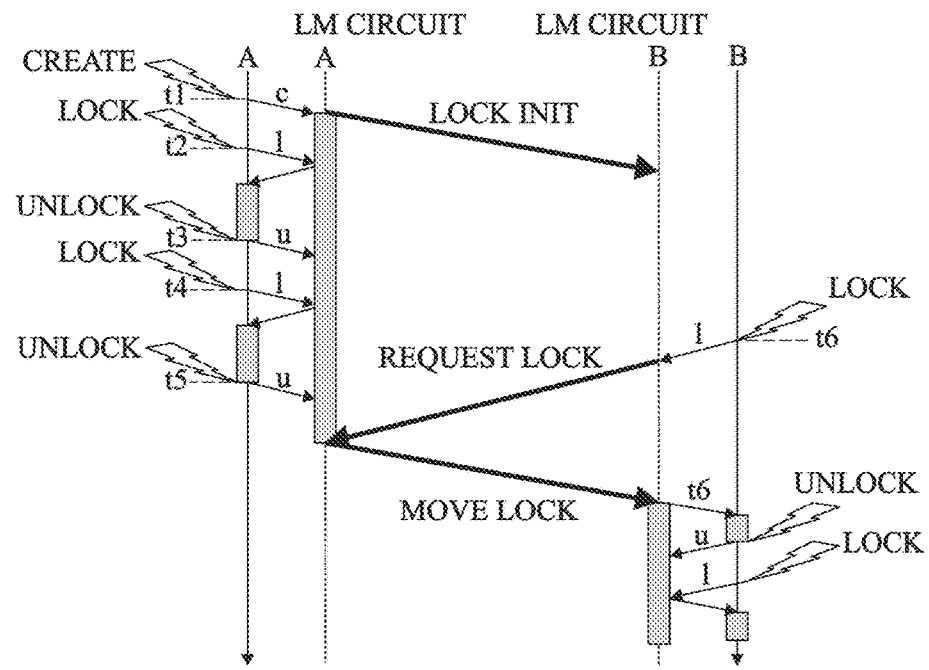
Fig 7

LOCK MANAGER FOR MULTI-CORE ARCHITECTURES

CROSS-REFERENCE TO RELATED APPLICATIONS

This application claims priority to French Patent application number 18/58803, the contents of which is incorporated by reference in its entirety.

TECHNICAL FIELD

The present disclosure relates generally to the field of multi-core computer architectures, and in particular to a circuit and method for managing locks.

BACKGROUND ART

In the field of computing, a lock or mutex (mutual exclusion) is a synchronization mechanism that limits access to a resource, for example access to one or more addresses in a memory. Such locks are used when there are multiple threads of execution being executed in parallel based on shared data, risking an incorrect operation if mutual exclusion of memory accesses is not imposed. A lock ensures that a single, unique processing thread has access rights to the resource at a given time.

A system is needed to manage the locks, including creating locks, and handling the requests from processors for ownership of a lock. As the number of processors in a multi-core architecture increases, the complexity of handling the locks also increases. Indeed, in general, the greater the number of processors, the greater the number of tasks that will be executed in parallel, and the greater the number of locks that need to be generated and managed.

In multi-core architectures, communications between the processors or CPUs (Central Processing Units) are generally performed via a network on chip (NoC) in which channels are provided between the processors. The management of locks in a multi-core architecture increases the number of messages to be transmitted over the NoC, leading to an increase in the communications load, which can in turn lead to communications delays.

There is a technical problem in providing a method and circuit for managing locks in a multi-core architecture that leads to a reduction in the communications burden.

Furthermore, there is a technical problem in providing a solution that scales well, in other words in which the communications burden increases in a relatively linearly fashion as the number of processor cores is increased.

SUMMARY

Embodiments of the present disclosure address one or more needs in the prior art.

According to one embodiment, there is provided a multi-core architecture comprising: a plurality of processing devices, each processing device comprising a single processor or a cluster of processors; and a lock manager associated with each processing device, each lock manager being configured to: store a first data value indicating of whether or not it currently owns a first lock, the first lock authorizing access to a resource; and permit an owner of the first lock to be determined by one or more lock managers by broadcasting, over an interconnection network to each of the other lock managers, at least one message.

According to one embodiment, the message broadcast to each of the other lock managers is either: a message indicating that ownership of the first lock has or will move to another processing device; or a message requesting ownership of the first lock.

According to one embodiment, each lock manager comprises a lock manager circuit comprising a logic circuit implementing a finite state machine.

According to one embodiment, each lock manager further comprises a memory storing a table having an entry associated with the first lock, the entry including the first data value.

According to one embodiment, each lock manager is partially implemented by one or more software modules providing an interface between a user application and the lock manager circuit.

According to one embodiment, the interconnection network is a network-on-chip.

According to one embodiment, the interconnection network is a 2D mesh implementing x-first message routing.

According to one embodiment, the lock managers are configured to transmit messages to each other over the interconnection network on at least three separate channels.

According to one embodiment, at least one of the plurality of processing devices is a cluster of two or more processors sharing one of said lock managers.

According to one embodiment, each lock manager is configured to transmit over the interconnection network some or all of the following messages to one or more other lock managers: a lock initiation broadcast message; a lock initiation acknowledgement message; a lock deletion message; a lock request message or a lock request broadcast message; a lock request acknowledgement message acknowledging receipt of the lock request message; a lock move message indicating when a lock has or will be moved to another lock manager; a lock move acknowledgement message acknowledging receipt of the lock move message; a lock denied message indicating that a lock is in use and cannot be transferred; and a lock moved message indicating that responsibility for a lock has been entirely transferred from one lock manager to another lock manager.

According to one embodiment, the lock managers are configured to store a distributed waiting list for lock ownership.

According to one embodiment, a processing thread executed by a first of the processing devices is only permitted to modify a lock when it is owned by the lock manager associated with the first processing device.

According to another aspect, there is provided a method of lock management in a multi-core architecture comprising a plurality of processing devices, each processing device comprising a single processor or a cluster of processors, the method comprising: storing, by a lock manager associated with each processing device, a first data value indicating whether or not the lock manager currently owns a first lock, the first lock authorizing access to a resource; and broadcasting, by one lock manager over an interconnection network to each of the other lock managers, at least one message permitting a current owner of the first lock to be identified.

According to one embodiment, the message broadcast to each of the other lock managers is either: a message indicating that ownership of the first lock has or will move to another processing device; or a message requesting ownership of the first lock.

According to one embodiment, the method further comprises: initiating a new lock by a first of the lock managers;

and broadcasting, by the first lock manager, a lock initiation message to each of the other lock managers informing them of the initiation of the new lock.

BRIEF DESCRIPTION OF DRAWINGS

The foregoing features and advantages, as well as others, will be described in detail in the following description of specific embodiments given by way of illustration and not limitation with reference to the accompanying drawings, in which:

FIG. 5 schematically illustrates a lock manager according to an example embodiment of the present disclosure;

FIG. 6 illustrates an entry in a lock table stored by the lock manager of FIG. 5 according to an example embodiment of the present disclosure;

FIG. 7 is a diagram representing an example of lock management communications in a multi-core architecture according to an example embodiment of the present disclosure;

DESCRIPTION OF EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the protocols for communications in an NoC are well known to those skilled in the art and will not be described in detail.

Unless indicated otherwise, when reference is made to two elements connected together, this signifies a direct connection without any intermediate elements other than conductors, and when reference is made to two elements linked or coupled together, this signifies that these two elements can be connected or they can be linked or coupled via one or more other elements.

Unless specified otherwise, the expressions "around", "approximately", "substantially" and "in the order of" signify within 10%, and preferably within 5%.

Figure 1:
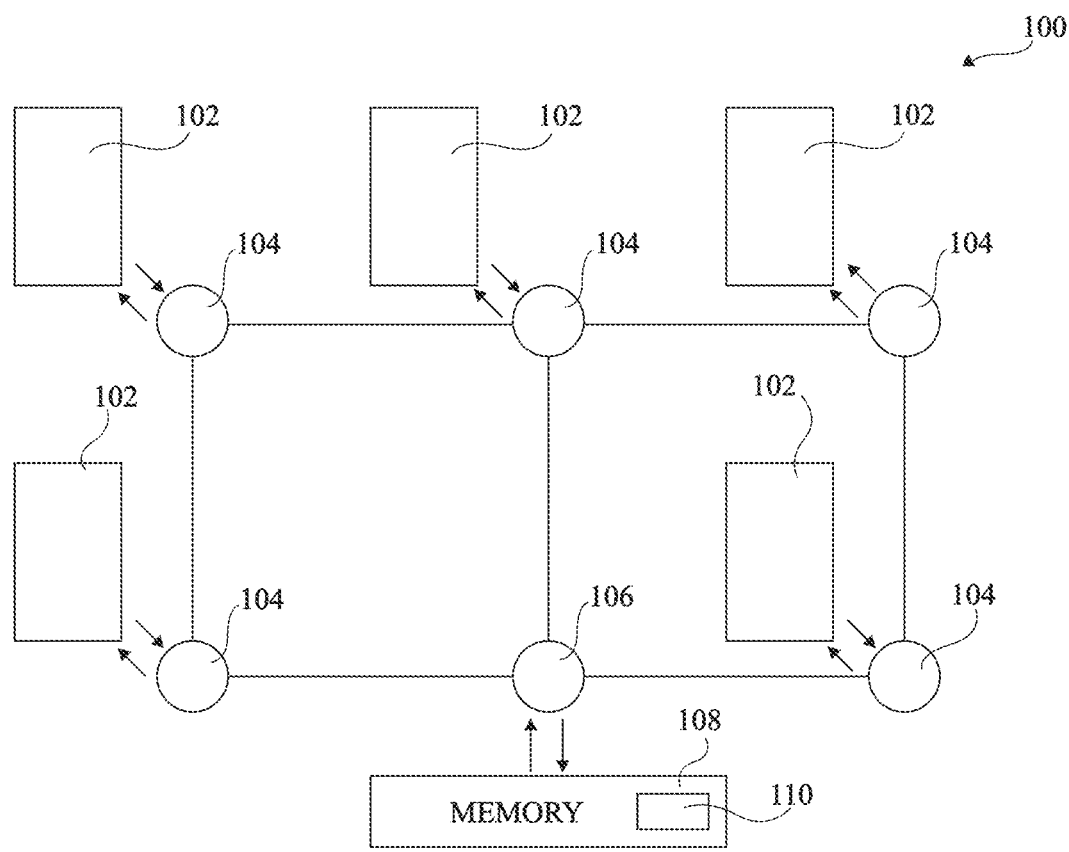
FIG. 1 schematically illustrates a multi-core computer architecture according to an example embodiment.

FIG. 1 schematically illustrates a multi-core computer architecture 100 according to an example embodiment. The architecture 100 comprises processing devices 102, five being illustrated in the example of FIG. 1. Each processing device 102 may correspond to a single CPU or to a cluster of CPUs. Each processing device 102 is for example coupled to a corresponding node 104 of an interconnection network, which is for example an NoC. A further node 106 of the network is for example coupled to a memory (MEMORY) 108, which is for example accessible by all of the processing devices 102 via the NoC.

The NoC is for example a mesh network based on message routing. Indeed, the nodes 104, 106 of the network are for example arranged in a 2D grid, interconnected by wired connections in x and y directions. Each node 104, 106 for example corresponds to a switch that is capable of temporarily storing messages, or subparts of messages known as flits, and routing them towards their destination. The transmission of messages across the network is for example performed using x-first routing, in other words messages are transmitted along the wired connections in the x-direction until they arrive in a column corresponding to their destination node, and they are then routed along the wired connections in the y-direction until they reach the destination node.

The memory 108 is for example a random access memory, and comprises at least one shared portion 110 corresponding to one or more addresses to be protected using one or more locks. For example, the shared portion 110 is shared by at least two, and in some cases all, of the processing devices 102. As known by those skilled in the art, a lock, also known as a mutex, is a property that can be assigned to any one of the processing devices 102 at a given time that allows only that processing device 102 to access and/or modify a portion of a memory. For example, each lock corresponds to a single memory address, or to a range of memory addresses. A protocol is implemented that ensures that the lock can be owned by a single processing device 102 at any given time, thereby preventing simultaneous memory accesses that could lead to incorrect execution of one or more execution threads. The creation of a lock for a given memory address or memory address range is for example initiated by a software application running on one of the processing devices of the multi-core architecture.

Figure 2:
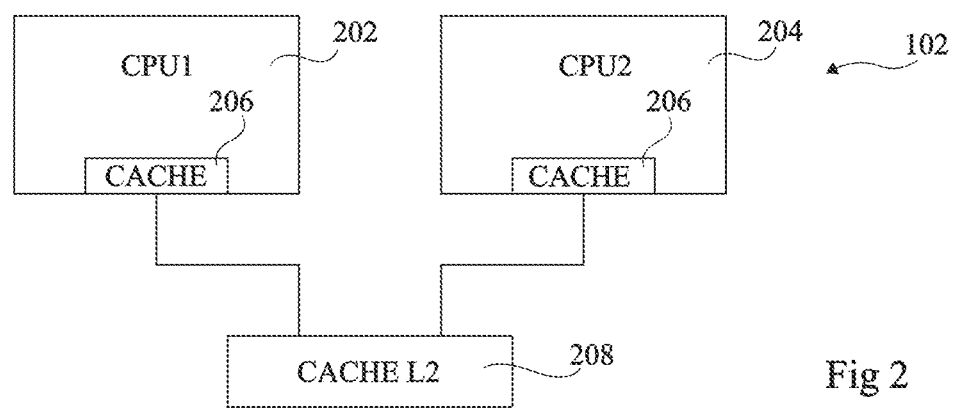
FIG. 2 schematically illustrates a cluster of the computer architecture of FIG. 1 in more detail according to an example embodiment.

FIG. 2 schematically illustrates one of the processing devices 102 in more detail according to an example in which it corresponds to a cluster of processors. In the example of FIG. 2, the device 102 comprises CPUs 202 (CPU1) and 204 (CPU2). Each CPU 202, 204 has a private local cache memory (CACHE) 206, and the CPUs of the cluster for example further share a level 2 cache memory (CACHE L2) 208.

Figure 3:
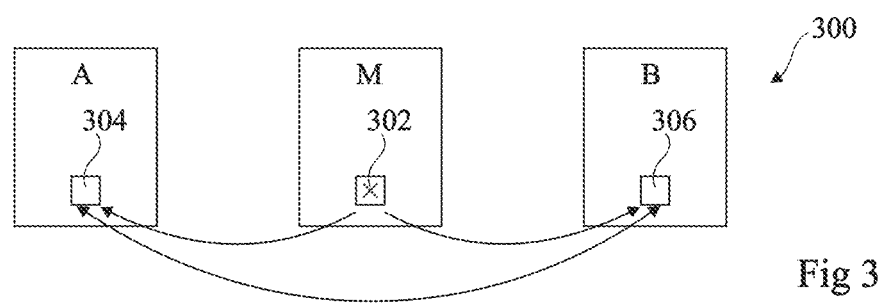
FIG. 3 represents a system of managing locks that has been proposed.

FIG. 3 represents a system for managing locks that has been proposed. For example, a similar approach was proposed in the publication by Kuo, Carter and Kuramkote entitled "MP-LOCKs: Replacing Hardware Synchronization Primitives with Message Passing", Proceedings fifth international symposium on High-Computer Architectures, 9-13 Jan, 1999. FIG. 3 shows processors A and B, and a server M. The server M is responsible for creating locks, and FIG. 3 shows the case in which a lock 302 is created. The lock may then be passed, upon request, to either of the processors A and B, as will now be described in more detail with reference to FIG. 4.

Figure 4:
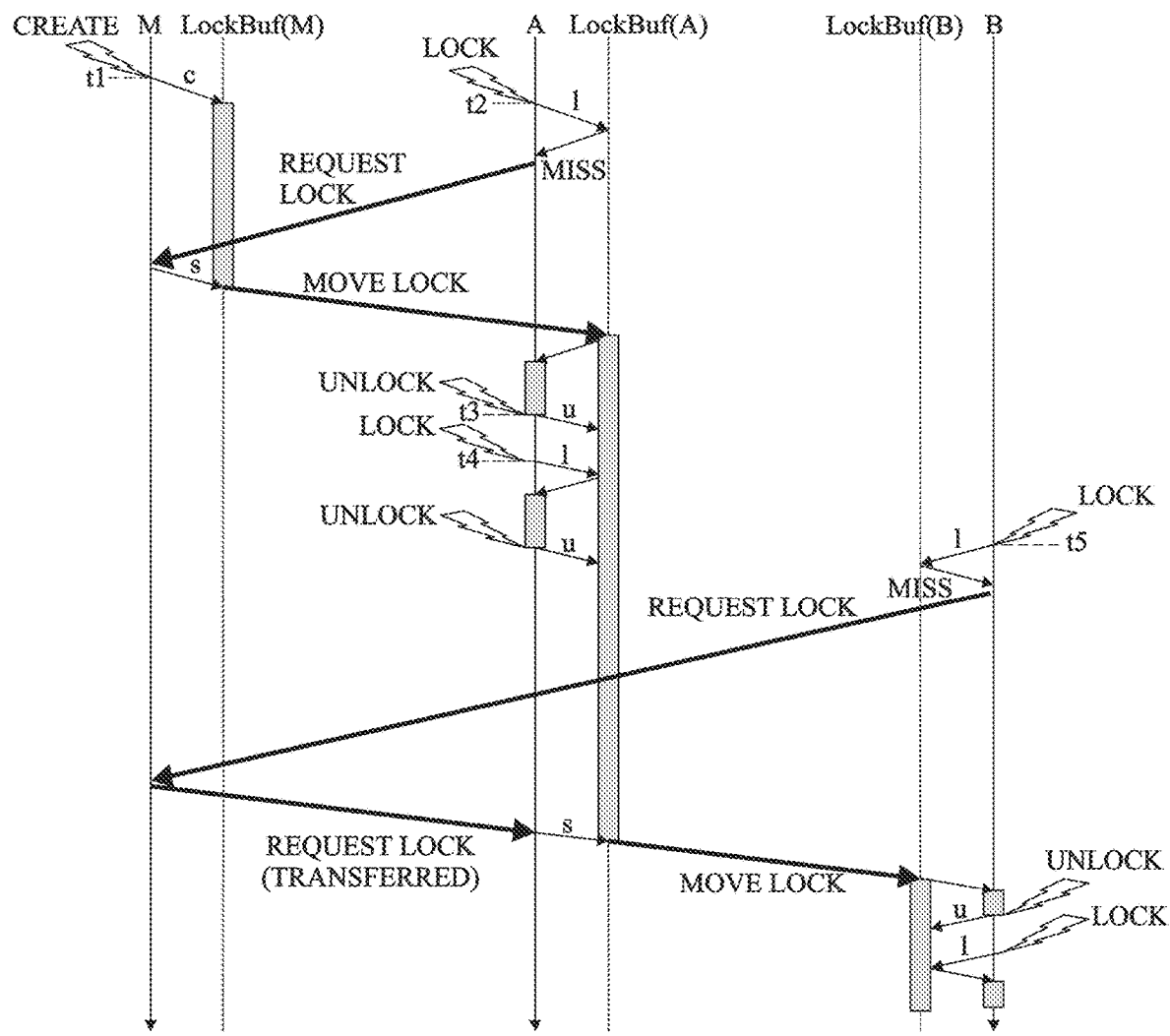
FIG. 4 is a diagram representing lock management communications in a multi-core architecture according to a method that has been proposed.

FIG. 4 is a diagram representing lock management communications in the architecture of FIG. 3. Solid vertical lines in FIG. 4 represent the server M and the execution threads A and B of the processors A and B respectively. The dotted vertical lines represent memory zones LockBuf(M), LockBuf(A) and LockBuf(B), which are memory zones respectively associated with the server M and with the processors A and B and reserved for lock management.

At a time t1, the server M creates a new lock (CREATE), and it is instantiated (c) in the local memory LockBuf(M) of the server M. The server M is the manager of this lock.

At a time t2, the processing thread A wishes to take ownership (LOCK) of the lock, and makes a lock request (1) to its local memory LockBuf(A), but obtains a miss. It for example issues a request (REQUEST LOCK) to the server M. The request is processed at the software level, and as the lock is available (s), the lock is moved (MOVE LOCK) to the local memory of the processor A. The lock is thus physically located in this local memory LockBuf(A), and when the lock is subsequently released (u) by the processing thread A at a time t3 (UNLOCK), it remains physically in the local memory LockBuf(A). Thus when the processing thread A again wishes to take ownership of the lock at a time t4 (LOCK), a hit is obtained from the local memory LockBuf(A), and the lock is directly obtained by the processing thread A.

At a time t5, the processing thread B wishes to acquire the lock, and obtains a miss from its local memory LockBuf(B). Not knowing who owns the lock, the processing thread B makes a request for the lock (REQUEST LOCK) to the server M. The request is forwarded by the server M to the processor A (REQUEST LOCK (TRANSFERRED)). As the lock is available, it is physically moved (MOVE LOCK) to the local memory LockBuf(B) of the processor B.

An advantage of the approach represented in FIGS. 3 and 4 is that, by physically storing the lock in the local memory of the processor that most recently obtained ownership of the lock, reassigning the lock to the same processor is straight-forward. This is beneficial, as studies have shown that there is statistically more chance of a lock being retaken by a same processor than the lock being requested by another processor.

However, a drawback of the approach of FIGS. 3 and 4 is that when a lock is to be transferred, the process is relatively demanding on processing resources and network communications. In particular, it involves a lock request to the server M, followed by a transfer of the request to the current owner, and then a move of the lock to the requesting processing thread. Each of these messages traverses the interconnection network between the server M, the processor A and the processor B, and thus leads to a relatively high burden on this network. Furthermore, the use of the central server M for lock management leads to a hot spot in the network, and as the size of the network increases, this can lead to communication issues such as congestion. Further still, the lock management being performed by software implies that each message received by a processor causes an interruption of the processor in order for the message to be processed, slowing the execution by the processors. Furthermore, in general software implementations are relatively slow to execute.

FIG. 5 schematically illustrates a lock manager 500 according to an example embodiment of the present disclosure. A lock manager similar to the one of FIG. 5 is for example implemented in association with each processing device 102 of the architecture of FIG. 1. The implementation of the lock manager 500 is for example at least partially in hardware. The approach is for example a decentralized approach, the lock managers 500 of the processing devices 102 managing the creation and transfers of locks without any centralized management.

In particular, the lock manager 500 comprises a lock manager circuit (LOCK MANAGER CIRCUIT) 502 comprising a memory 504 storing a table of one or more locks (LOCKS) that are implemented in the system. The memory 504 is for example implemented by a volatile memory, such as a bank of registers. The circuit 502 is for example accessed via an MMU 506, which directs messages from the operating system of the processing device 102 to either the lock manager circuit 502 or to a memory (MEMORY) 508, which is for example a cache memory such as the cache 208 of FIG. 2. As represented by a cloud 509 in FIG. 5, whereas the lock manager circuit 502 for example operates based on the virtual address space of the user application 512, address conversion is for example provided in the MMU 506 to translate virtual addresses into physical addresses of the memory 508.

A block 510 in FIG. 5 represents functions of the lock manager 500 that are for example implemented in software executed by the host processing device 102. This software for example provides an interface between a user application (USER APP) 512 and the lock manager circuit 502. The software modules 510 for example comprises a lock commands library (LOCK COMMANDS LIBRARY) 514, and a control module (CONTROL MODULE) 516. These modules 510 for example generate commands for controlling the lock manager circuit 502. In some embodiments, these software modules are configured to operate in the Linux environment, although other solutions would be possible.

The lock commands library for example contains one or more of the following four functions for controlling the lock manager circuit 502:

a lock creation function, that for example guarantees the unicity of a created lock with respect to existing locks. For example, the software modules 510 store an image of the locks of the table 504. In some embodiments, the image of the table is protected by a supplementary lock, implemented for example in software in a standard manner, in order to prevent simultaneous modification of the table by more than one user/processing thread lock manager;

a lock deletion function for the destruction of one or more existing locks;

a lock obtain function for managing a request to obtain a lock. If the lock is not available, the lock manager joins a waiting list for the lock (described in more detail below) and the host processing device is for example made to wait until the lock manager is able to obtain the lock. The processing device is for example made to wait actively or passively, depending on a parameter assigned to the lock at the time of its creation. Actively waiting for example means that the processing device will remain active and ready to receive a response from the lock manager circuit 502 indicating when the lock has been obtained. Passively waiting for example means that the processing thread enters a sleep mode to conserve power. The processing thread is for example woken from the sleep mode by an IRQ (interrupt request) signal generated by the lock manager circuit 502 (not illustrated in FIG. 5); and an unlock function that causes a lock to be liberated.

FIG. 6 illustrates an example of an entry in the table of locks 504 stored by the lock manager circuit 502 of FIG. 5. Each entry for example includes some or all of the following fields:

the owner (OWNER): this field, for example comprising a single bit, indicates whether or not the lock is owned by the processing device 102 associated with the lock manager storing the table;

the next cluster (NEXT_CLUSTER): this field, which for example comprises a sufficient number of bits to identify all of the processing devices 102 of the architecture, for example indicates the identifier of the next lock manager on the waiting list to acquire the lock;

a pointer (POINTER): this field, which also for example comprises a sufficient number of bits to identify all of the processing devices 102 of the architecture, for example indicates the current owner of the lock;

waiting (WAITING): this field, for example comprising a single bit, indicates that the lock manager is already on the waiting list for the lock. Thus if another processing thread of the processing device makes a request for the same lock, the lock manager need not transmit another request for the lock;

old (OLD): this field, for example comprising a single bit, indicates when the lock manager was the previous owner of the lock, which is an intermediate state following transfer of the lock but before all responsibilities in relation to the lock have been transferred; and a fairness counter (FAIRNESS COUNTER): this value is for example used to indicate the number of consecutive attributions of the lock to the host processing device 102, and for example permits a equality policy to be implemented. For example, in one embodiment a lock is transferred to another lock manager if the number of consecutive attributions to the local host processing device reaches a threshold of x attributions. For example, x is a value of between 2 and 20, and in some cases in the range 4 to 12.

The lock management protocol implemented by the lock managers 500 for example guarantees some or all of the following conditions:

1) Coherence between the lock tables stored by all of the lock managers.

2) That a single lock manager/processing device owns a lock at any given time.

3) That a single processing thread is granted the lock at a given time, in other words that a change of state of a lock (locked/unlocked) is triggered by a single processing thread.

4) That deadlocks do not occur in the interconnection network.

5) That a lock manager/processing thread requesting a lock obtains a response.

6) That there is an absence of famine in the attribution of locks, in other words that a lock manager requesting a lock will receive the lock in due course.

7) That the attribution of locks is fair.

The conditions 6 and 7 above are for example met by using a waiting list that is distributed among the lock managers in order to minimize the memory space for storing the list. In particular, when a lock manager 500 requests a lock that is already attributed to another lock manager 500, the lock manager requesting the lock receives a negative response, but the request is taken into account by addition of an identifier of the lock manager to the waiting list. In particular, the lock manager that currently possesses the lock for example writes to the "next cluster" field in its table of locks the identifier of the lock manager requesting the lock, unless this field already indicates another lock manager. In the latter case, the lock manager currently possessing the lock forwards the request to the next lock manager identified in the "next cluster" field, which in turns stores the identifier in its "next cluster" field, or forwards the request if this field already indicates another lock manager. In this way, the lock manager making the latest request for the lock will be added to the end of the waiting list.

FIG. 7 is a diagram representing an example of lock management communications using the lock manager 500 of FIG. 5. The diagram of FIG. 7 is similar to that of FIG. 4, except that in view of the decentralized approach, there is no longer a server M, and the number of messages transmitted during a transfer of the lock is reduced.

Indeed, the example of FIG. 7 assumes that the processing thread A creates (CREATE, c) a lock at a time t1, and requests ownership of the lock (LOCK, 1) at a time t2, which is granted. Thus the "owner" field is initiated in the lock table 504 of the lock manager corresponding to the processing thread A. The lock manager circuit A indicates the identifier of the lock owner in the table, and broadcasts a message (LOCK_INIT) to the other lock managers such that they also initiate the lock in their respective lock tables and initiate the pointer to the identifier of the owner. The lock is for example unlocked (UNLOCK, u) by the processing thread A at a time t3, requested again by the processing thread A at a time t4, and then unlocked again by the processing thread A at a time t5. At a time t6, which may be before the time t5, the processing thread B requests ownership of the lock. The lock manager of the processing thread B knows from the lock table 504 the identifier of the current lock owner, and thus the request (REQUEST LOCK) is for example transmitted directly to the lock manager of the processing thread A. This request arrives at the lock manager of the processing thread A once the lock has already been released, and thus, finding the lock available, the lock manager of the processing thread A for example replies with a positive response (MOVE LOCK) to the lock manager of the processing thread B, which becomes the new owner of the lock at a time t6 following its transfer.

The move lock signal indicating when a lock is moved from one lock manager to another is for example a broadcast signal sent to all of the lock managers, as will now be described in more detail with reference to FIG. 8.

Figure 8:
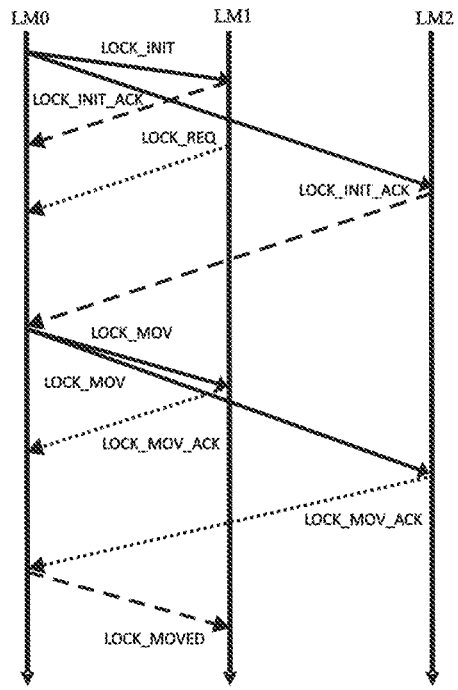
FIG. 8 is a diagram representing a first example of the transmission of messages between lock managers according to an example embodiment of the present disclosure.

FIG. 8 is a diagram representing an example of communications between lock managers. In the example of FIG. 8, the multi-core computing architecture comprises three processing devices having lock managers LM0, LM1 and LM2 respectively. Vertical lines in FIG. 8 associated with each lock manager represent time, and arrows between the vertical lines represent messages transmitted between the lock managers.

In one example, the communication protocol between the lock managers supports some or all of the messages defined in the following table, the names of these messages being provided by way of example only:

TABLE 1

| | |
|---|---|
| LOCK_INIT | Broadcast message generated following the creation of a new lock instructing the destination lock managers to instantiate a new lock in their lock tables for a lock identifier provided in the message |
| LOCK_INIT_ACK | Acknowledgement message sent in response to the message LOCK_INIT if the lock instantiation of the new lock has been performed successfully |

TABLE 1-continued

| | |
|---|---|
| LOCK_DEL | Request for the deletion of a lock, the identifier of the lock being indicated in the message |
| LOCK_REQ | Request to acquire a lock, the identifier of the lock being indicated in the message |
| LOCK_MOV | Broadcast message indicating that a request for a lock can be accepted and partially transferring responsibility to the new lock manager |
| LOCK_LOCKED | Refusal of a request to access a lock |
| LOCK_MOVED | Final transfer of responsibility of the lock to the new lock manager |
| LOCK_NEXT_CLUSTER | Transfer of an identifier of a lock manager to be added to the waiting list |
| LOCK_NEXT_ACK | Acknowledgement of the message LOCK_NEXT_CLUSTER |
| LOCK_MOV_ACK | Acknowledgement of the message LOCK_MOV |
| LOCK_ERR | An indication that the requested action cannot be processed |

FIG. 8 illustrates an example of messages transmitted between lock managers in response to the initialization of a lock by the lock manager LM0 and then the transfer of this lock to the lock manager LM1. For example, the lock manager circuit of the lock manager LM0 receives a software request from the software modules 510 of its lock manager requesting the creation of a new lock for a given address @.

Initially, upon creation of the new lock by the lock manager LM0, it asserts its owner bit, sets the pointer to LM0, and the message LOCK_INIT is for example transmitted by the lock manager LM0 to each of the other lock managers LM1 and LM2 such that this lock can be added to their respective lock tables. Each of the lock managers instantiates the lock, sets its pointer to LM0, and responds with the acknowledgement message LOCK_INIT_ACK.

After receiving the message LOCK_INIT, the lock manager LM1 for example requests to acquire the lock by transmitting the message LOCK_REQ to the lock manager LM0. Once the lock manager LM0 has received the messages LOCK_INIT_ACK from each of the lock managers, the lock is for example moved to the lock manager LM1 by bringing low the "owner" bit and asserting the "old" bit in the lock manager LM0, and transmitting from the lock manager LM0 the broadcast of the message LOCK_MOV to both of the lock managers LM1 and LM2. The lock managers LM1 and LM2 for example receive the message LOCK_MOV, update their "pointer" fields to point to LM1, and reply with the LOCK_MOV_ACK message. The lock manager LM1 also asserts its "owner" bit. Once the lock manager LM0 has received the acknowledge message LOCK_MOV_ACK from each of the lock managers, it for example brings low its "old" bit, and sends the LOCK_MOVED message to the new lock manager LM1 to finalize the transfer. Until the lock manager LM1 has received the message LOCK_MOVED, it for example manages the state of the lock as either locked or released, but cannot transfer the lock.

In some embodiments, to avoid congestion of the messages in the NoC, the messages are for example transmitted using at least three separate channels. Each channel for example corresponds to an independent transmission path for messages, for example achieved using multiple wires and/or using virtual channels (i.e. time multiplexing) on one or more shared wires. For example, in one embodiment, any message that results in the transmission of an acknowledgement message or other form of response message is transmitted on a separate channel from the acknowledgement message. Thus the messages LOCK_INIT and LOCK_INIT_ACK are for example transmitted on separate channels, and the messages LOCK_MOV and LOCK_MOV_ACK are for example transmitted on separate channels. In the example of FIG. 8, the solid-line arrows represent messages transmitted on a first channel, the dashed-line arrows represent messages transmitted on a second channel, and the dotted line arrows represent messages transmitted on a third channel.

In one embodiment, the messages transmitted on the channels are represented in the following table, in which the channel names are provided merely as an example:

TABLE 2

| Channel Name | Messages | Description |
|---|---|---|
| Response | LOCK_ERR LOCK_INIT_ACK LOCK_MOVED LOCK_NEXT_ACK | This channel is for example used to transmit messages that do not directly result in the generation of new reply messages |
| Request | LOCK_REQ LOCK_MOV_ACK | This channel is used for the message LOCK_REQ, which may potentially result in the generation of many more messages. An advantage of providing the message LOCK_MOV_ACK in this channel is that it ensures that no request is waiting in the network |
| Move | LOCK_MOV LOCK_NEXT_CLUSTER LOCK_LOCKED LOCK_INIT LOCK_DEL | This channel is used for broadcast messages, such as the messages LOCK_MOV, LOCK_INIT and LOCK_DEL. The message LOCK_LOCKED is for example transmitted in the same channel as LOCK_MOV to prevent the order of arrival of these messages being altered |

Figure 9:
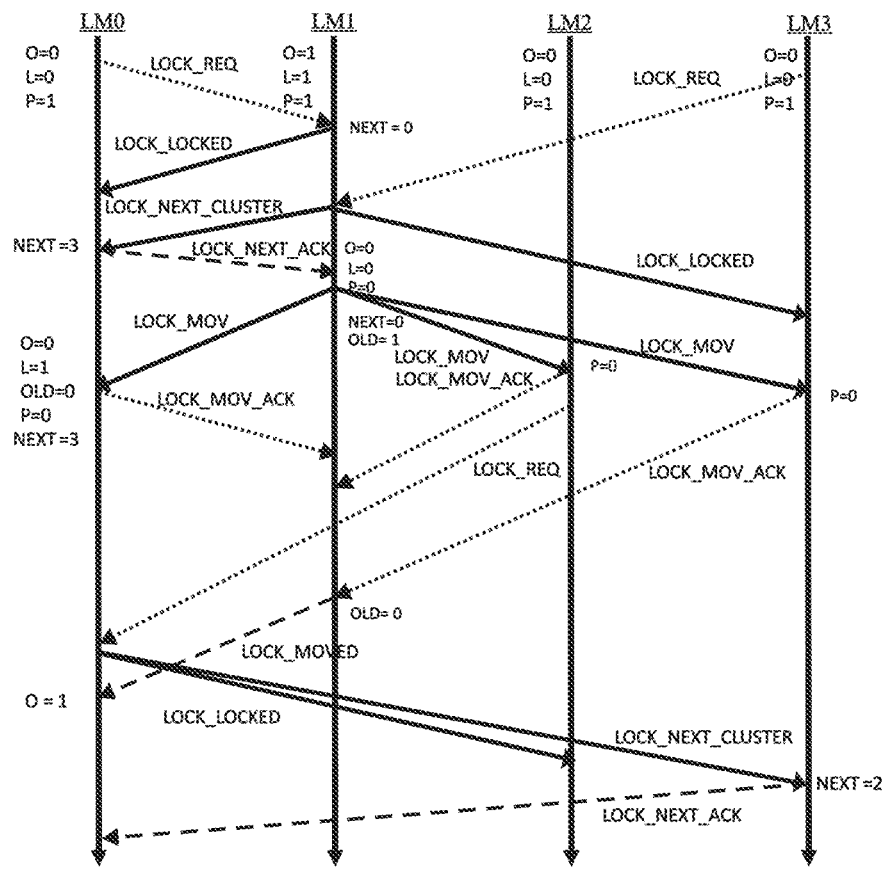
FIG. 9 is a diagram representing a second example of the transmission of messages between lock managers according to an example embodiment of the present disclosure.

FIG. 9 is a diagram representing an example of messages transmitted between lock managers according to a further example embodiment. In FIG. 9, values O, L, P, OLD and NEXT are shown for each lock manager. The value O=1 indicates that the lock manager is the owner of the lock, whereas the value O=0 indicate the opposite. The value L=1 indicates the locked state of the lock, whereas the value L=0 indicates that the lock is free. The value P=1 indicates that the "pointer" field points to the owner of the lock, whereas the value P=0 indicates the opposite. The value OLD indicates whether the field "old" is true or false. The value NEXT is a pointer towards the next lock manager waiting for the lock.

As shown in FIG. 9, initially the lock manager LM1 is the owner of the lock, and the lock is locked by a corresponding processing thread, as indicated by L=1. The lock manager LM0 transmits a request message LOCK_REQ for the lock to the lock manager LM1, which is identified in the "pointer" field of the entry for the lock in the lock table of the lock manager LM0.

The lock manager LM1 replies by indicating, with the message LOCK_LOCKED, that the lock is locked by a processing thread, and the lock manager LM1 stores, in its "next cluster" field, an identifier of the lock manager LM0 as being the next lock manager waiting for the lock. For example, an identifier "0" is written to the "next cluster" field. The lock manager LM0 thus places the processing thread requesting the lock in waiting mode, for example in a sleep mode as described above. The "waiting" field in the lock manager LM0 is for example set to true to indicate to any other processing threads executed by the same processing device that the lock has already been requested, thereby avoiding the transmission of further lock requests by the lock manager LM0 for the same lock.

The lock manager LM3 also sends a lock request message LOCK_REQ to the lock manager LM1 indicated by its "pointer" field. The lock manager LM1 replies by indicating, with the message LOCK_LOCKED, that the lock is locked by a processing thread. As the "next cluster" field of the lock manager LM1 is not empty, the lock manager LM1 also for example sends a message LOCK_NEXT_CLUSTER to the lock manager indicated in its "next cluster" field, which is the lock manager LM0, in order to request that the identifier of the lock manager LM3 be added to the waiting list.

The lock manager LM0 receives this message LOCK_NEXT_CLUSTER, updates its "next cluster" field to indicate the identifier of the lock manager LM3, and sends the message LOCK_NEXT_ACK to the lock manager LM1. This message also indicates to the lock manager LM1 that the transmission channel is now free in case a new LOCK_NEXT_CLUSTER message needs to be sent from the lock manager LM1 to the lock manager LM0, and thus avoids deadlocks in the message transmissions.

The lock is then released by the lock manager LM1, which broadcasts to all of the other lock managers the message LOCK_MOV indicating that the new owner is the lock manager LM0 (i.e. identifier "0"), as indicated in its "next cluster" field. The lock manager LM1 sets its "pointer" field to the identifier of the next owner LM0, and also sets its "old" field to true. The other lock managers receiving the message LOCK_MOV also set their "pointer" fields to the identifier of lock manager LM0, and send back a message LOCK_MOV_ACK to the previous owner LM1 confirming that the new ownership has been recorded. The lock manager LM0 for example locks the lock as indicated by L=1.

The lock manager LM2 then for example requests the lock by sending a message LOCK_REQ to the owner indicated in its "pointer" field. The lock manager LM0 replies with the LOCK_LOCKED message. This would have been the case even if the lock was not already locked, as the lock manager LM0 does not yet have complete responsibility of the lock and cannot therefore transfer the lock until it has received the message LOCK_MOVED. This time the "next cluster" field is not empty but contains the identifier of the lock manager LM2, which is on the waiting list for the lock. The lock manager LM0 thus sends the message LOCK_NEXT_CLUSTER to the lock manager LM2.

Once the previous lock owner LM1 has received all of the messages LOCK_MOV_ACK, this signifies that all of the pending lock requests LOCK_REQ made to the lock manager LM1 have been processed, these messages sharing a same channel. The lock manager LM1 thus sets its "old" field to false, and the message LOCK_MOVED is sent to the new owner LM0, which changes its "owner" field to true.

Figure 10:
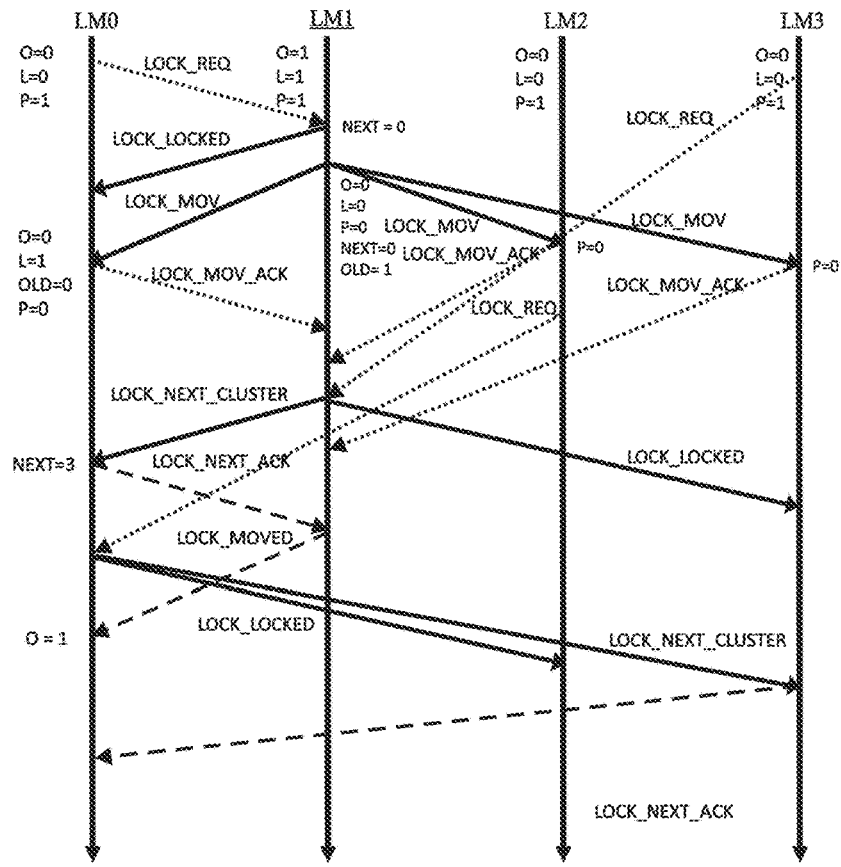
FIG. 10 is a diagram representing a third example of the transmission of messages between lock managers according to an example embodiment of the present disclosure.

FIG. 10 is a diagram representing an example of messages transmitted between lock managers according to yet a further example embodiment. The labelling in FIG. 10 is similar to that of FIG. 9, and will not be described again in detail.

FIG. 10 demonstrates the benefit of including in a same channel the messages LOCK_REQ and LOCK_MOV_ACK. Indeed, this ensures that when a lock manager that was a previous owner of a lock receives the message LOCK_MOV_ACK from another lock manager, such as the message issued by the lock manager LM3 in FIG. 10, all of the messages LOCK_REQ from the previous lock manager have been received.

Furthermore, it can be seen in FIG. 10 that the message LOCK_NEXT_CLUSTER is issued by a previous owner of the lock when the "old" field is true. In such a case, the complete transfer of ownership of the lock is dependent on the reception of the messages LOCK_NEXT_ACK in order to guarantee that all of the requests being processed by the previous owner have been completed before the message LOCK_MOVED is transmitted, which permits a new transfer of the lock.

Figure 11:
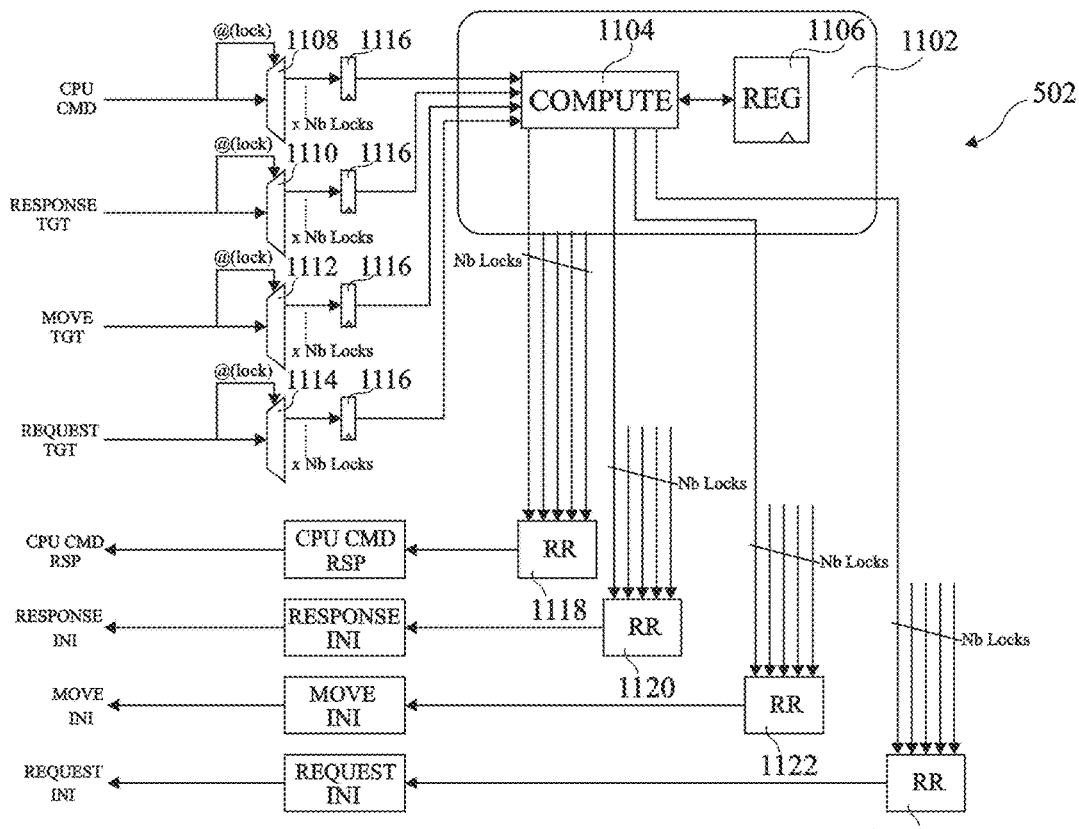
FIG. 11 schematically illustrates a lock manager circuit of FIG. 5 in more detail according to an example embodiment of the present disclosure.

FIG. 11 schematically illustrates the lock manager circuit 502 of FIG. 5 in more detail according to an example embodiment. The circuit for example comprises, for each lock, a circuit block 1102 comprising a compute logic block (COMPUTE) 1104 and a register (REG) 1106, which stores an entry having the fields of FIG. 6. The compute logic block 1104 is for example implemented by a finite state machine. The compute logic block 1104 for each lock for example receives a corresponding output of four demultiplexers 1108, 1110, 1112 and 1114 that respectively receive, as the target (TGT), signals from: the host processing device (CPU CMD); the response channel (RESPONSE TGT); the move channel (MOVE TGT); and the request channel (REQUEST TGT). The demultiplexers 1108, 1110, 1112 and 1114 are for example controlled by the lock address indicated in each message to direct the message to the compute logic block 1104 of the corresponding lock. Buffers 1116 are for example provided between each demultiplexer 1108, 1110, 1112 and 1114 and the respective compute logic blocks 1104. In some embodiments, the buffers 1116 are FIFOs.

The number Nb of locks, and thus the number of circuit blocks 1102, is for example chosen based on the maximum number of locks expected to be used in the multi-core architecture. In some embodiments Nb is equal to at least 16, and in some cases is equal to up to 256.

The compute logic block 1104 for example generates output signals to four round robin switches (RR) 1118, 1120, 1122 and 1124, which respectively provide the messages from the compute logic blocks 1104 to: a host processing device output (CPU CMD RSP); and signals to the message initiators (INI) on the response channel (RESPONSE INI); the move channel (MOVE INI); and the request channel (REQUEST INI).

While FIG. 11 corresponds to a case in which there is one compute logic block 1104 per lock, in alternatively embodiments it would be possible to mutualize one or more compute logic blocks 1104 for use by more than one lock.

Figure 12:
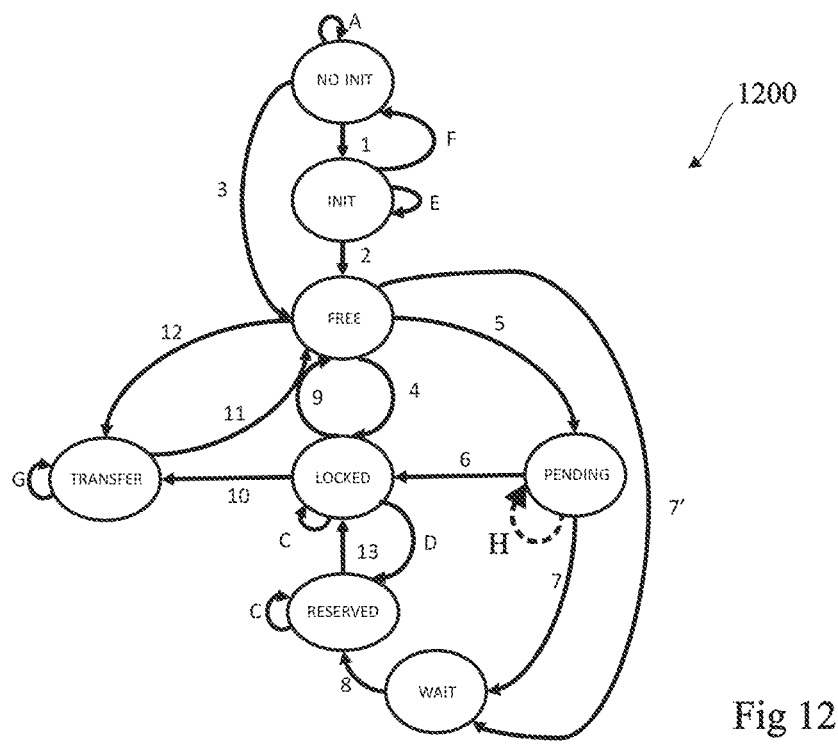
FIG. 12 is a state diagram representing the operation of a finite state machine of the lock manager circuit of FIG. 11 according to an example embodiment of the present disclosure.

FIG. 12 is a state diagram 1200 representing operation of the compute logic block 1104 of FIG. 11 according to an example embodiment.

A lock manager remains in a state NO INIT until a transition to a state INIT, represented by an arrow "1", in response to the reception of a lock creation command from the host processing device. In response, the broadcast message LOCK_INIT is for example transmitted. As represented by an arrow "A", if however, while in the state NO INIT, the lock manager receives a message other than LOCK_INIT, or a CPU message other than lock create, an error message LOCK_ERR is for example generated.

As represented by an arrow "E", the lock manager remains in the state INIT until the message LOCK_ACK has been received from each other lock manager. Once this is the case, the "owner" field is set to true, the "pointer" field is set to the ID of the lock manager, and the state transitions to a state FREE, as represented by an arrow "2". However, if any message LOCK_ACK is missing after a certain timeout, the state transitions back to the state NO INIT as represented by an arrow "F", and a return error is for example generated.

As represented by an arrow "3", the state FREE is also for example reached directly from the state NO INIT if the message LOCK_INIT is received. In response, the "owner" field is set to false and the "pointer" field is set to the identifier of the requesting lock manager indicated in the LOCK_INIT message.

As represented by an arrow "4", from the state FREE, a transition to a state LOCKED occurs if the lock is requested by a processing thread and the lock is owned by the lock manager. In response, the fairness counter is for example decremented, and a response to the host processing device is generated indicating that the lock has been successfully acquired.

As represented by an arrow "5", a transition from the state FREE to a state PENDING occurs if the lock is not currently owned by the lock manager and the "waiting" field is false, or if the "waiting" field is true and the lock is not currently owned by the lock manager. In response, the message LOCK_REQ is sent to the lock manager designated in the "pointer" field.

As represented by an arrow "6", from the state PENDING, a transition to the state LOCKED for example occurs if the message LOCK_MOV is received and the new pointer is equal to the ID of the lock manager. In response, the fairness counter is decremented, the "owner" field is set to true, the pointer is updated, and the message LOCK_MOV_ACK is sent.

As represented by an arrow "7", a transition from the state PENDING to a state WAIT occurs when the message LOCK_LOCKED is received. In response, the "waiting" field is set to true, and the host processing device is informed that the lock is locked.

As represented by an arrow "7", a transition from the state FREE to the state WAIT occurs if the lock manager is not the owner of the lock and the "waiting" field is true, the host processing device is also informed that the lock is locked.

As represented by an arrow "8", a transition from the state WAIT to a state RESERVED occurs if the signal LOCK_MOV is received and the new pointer is equal to the ID of the lock manager. The "owner" field is then set to true, the "waiting" field is set to false, the "pointer" field is updated, and the signal LOCK_MOV_ACK is sent.

As represented by an arrow "9", a transition from the state LOCKED to the state FREE occurs if the host processing device requests the release of the lock, the "waiting" field is false and the "next cluster" field is empty.

As represented by an arrow "10", a transition from the state LOCKED to a state TRANSFER for example occurs if the host processing device requests the release of the lock, the "next cluster" field is not empty, and the "waiting" field is false or the fairness counter has reached zero, the "owner" field is set to false, the "old" field is set to true, the pointer is set to the next cluster, and the counter of the messages MOV_ACK is set low. The broadcast message LOCK_MOV is also sent to the other lock managers.

As represented by an arrow "11", a transition from the state TRANSFER to the state FREE for example occurs if the message LOCK_MOV_ACK has been received from all of the other lock managers, the message LOCK_NEXT_ACK has been received in response to each transmitted message LOCK_NEXT_CLUSTER, and there is a lock manager in the waiting list. In response, the "owner" and "old" fields are set to false, and the message LOCK_MOVED is sent.

As represented by an arrow "12", a transition from the state FREE to the state TRANSFER for example occurs if the message LOCK_REQ is received and the "owner" field is true. In response, the "owner" field is set to false, the pointer field is set to the ID of the requesting lock manager, the "old" field is set to true, the message LOCK_MOV is sent, and the counter of the number of received messages MOV_ACK is set to zero.

As represented by an arrow "13", a transition from the state RESERVED to the state LOCKED for example occurs if the host processing device requests the locking of the lock. In response, the fairness counter is decremented, and the host processing device is informed.

The arrows "C" indicates when the lock manager will remain in the states LOCKED and RESERVED. The conditions for this, and the response, are for example any of the following:

the message LOCK_REQ is received and the field "next cluster" is empty, the response being that the field "next cluster" is set to the ID of lock manager requesting the lock and the message LOCK_LOCKED is sent;

the message LOCK_REQ is received and the field "next cluster" is equal to the ID of the lock manager requesting the lock, the response being to send the LOCK_LOCKED message; or the message LOCK_REQ is received and the field "next cluster" is not empty and not equal to the ID of the lock manager requesting the lock, the response being to send to both the LOCK_LOCKED message and the LOCK_NEXT_CLUSTER message.

The arrow "D" indicates when the lock manager will transition from the state LOCKED to the state RESERVED, which for example occurs when the host processing devices issues an unlock command, the "waiting" field is true, and the "fairness counter" field is not at zero. In response, the "waiting" field is for example set to false, and an interrupt is sent to the host processing device to wake the processing thread.

The arrow "G" indicates when the lock manager will remain in the state TRANSFER. The conditions for this, and the response, are for example any of the following:

the message LOCK_MOV_ACK is received and the counter of the number of received messages LOCK_MOV_ACK is not yet equal to one less than the number of lock managers, the response being that this counter is incremented;

the message LOCK_REQ is received, the response being to send the message LOCK_NEXT_CLUSTER to the lock manager indicated by the "pointer" field, to increment a counter of the number of LOCK_NEXT_ACK messages still expected, and send the message LOCK_LOCKED to the requesting lock manager; or the message LOCK_NEXT_ACK is received and the counter of the number of LOCK_NEXT_ACK messages still expected is greater than one, the response being to decrement this counter.

Additionally, there are several arrows that are not illustrated in FIG. 12 for ease of illustration and which will now be described.

It is for example possible to transition from any state back to the state NO INIT if the host processing device issues a lock delete command, the response being to reinitialize the fields of the lock, to broadcast to the other lock managers the LOCK_DEL command, and to clear the FIFO buffers 1116.

There is for example an internal transition within the states PENDING, WAIT, LOCKED and RESERVED when any of the following occurs:

the message LOCK_NEXT_CLUSTER is received and the "next cluster" field is not empty, the response being to set the "next cluster" field to the ID of the lock manager requesting ownership of the lock and to send the message LOCK_NEXT_ACK;

the message LOCK_NEXT_CLUSTER is received and the "next cluster" field is equal to the ID of the lock manager requesting ownership of the lock, the response being to send the message LOCK_NEXT_ACK; or the message LOCK_NEXT_CLUSTER is received and the "next cluster" field is not empty and the "next cluster" field is not equal to the ID of the lock manager requesting ownership of the lock, the response being to send the messages LOCK_NEXT_CLUSTER and LOCK_NEXT_ACK.

There is for example an internal transition within the states PENDING, WAIT and LOCKED that occurs when the host processing device issues a lock command, the response being to issue a return message to the host processing device that notifies the processing thread that the lock is locked, and to assert the "waiting" field.

There is for example an internal transition within all of the states when the message LOCK_MOV is received and the new value of the pointer is not equal to the ID of the lock manager, the response being to update the "pointer" field and send the message LOCK_MOV_ACK to the lock manager that sent the message LOCK_MOV.

There is for example an internal transition within all of the states when the message LOCK_ERR is received, the response being to issue a return message to the host processing device indicating the error.

There is for example a transition from all of the states to the state NO INIT when the message LOCK_DEL is received, the response being to reinitialize the fields of the lock and to clear the FIFO buffers 1116.

While a particular protocol for managing locks using the lock managers of the architecture has been described, other implementations would be possible, as will now be described in more detail.

Rather than the message LOCK_MOV being broadcast and each of the lock managers recording as a new pointer the lock manager having the lock, in alternative embodiments the lock requests could be broadcast, as will now be described in relation with FIG. 13.

Figure 13:
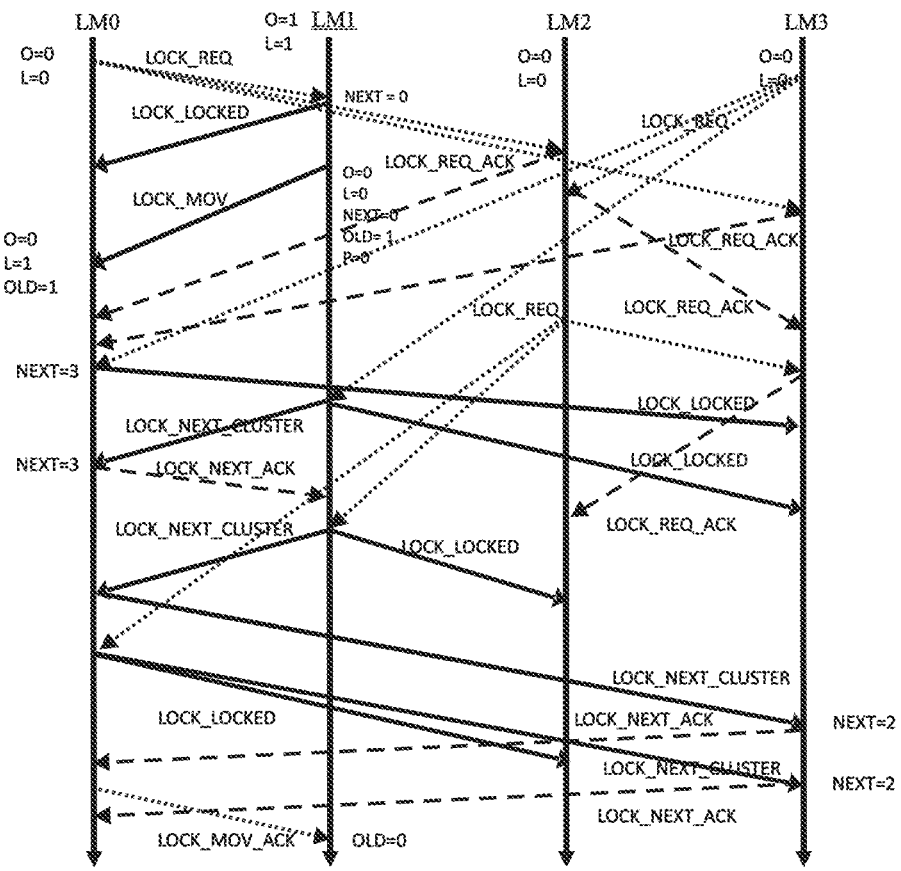
FIG. 13 is a diagram representing a further example of the transmission of messages between lock managers according to an example embodiment of the present disclosure based on a further lock management protocol.

FIG. 13 is a diagram representing an example of messages transmitted between lock managers. The labelling in FIG. 13 is similar to that of FIG. 9, and will not be described again in detail.

As it can be seen from FIG. 13, in order to guarantee a response to all requests, a lock manager receiving the message LOCK_REQ always responds according to one of the following:

if the lock manager is the owner of the lock, it responds based on the state of the lock with the message LOCK_LOCKED or the message LOCK_MOV;

if the lock manager is not the owner of the lock, but is the previous owner, i.e. the value OLD is true, it responds with the message LOCK_LOCKED and transmits the message LOCK_NEXT_CLUSTER to the new owner;

if the lock manager is neither the owner of the lock nor the previous owner, it responds with the message LOCK_REQ_ACK.

If a lock manager receives a message LOCK_NEXT_CLUSTER for a lock that it owns, but which has already been freed, the lock is directly transferred to the next lock manager.

The true state of the "old" field implies that all messages should be responded to with the message LOCK_LOCKED, and the requests are sent to the new owner by sending the message LOCK_NEXT_CLUSTER. For this purpose, the "pointer" field for example stores a pointer to the lock manager to which the lock was transferred.

The message LOCK_REQ is responded to by all of the other lock managers with either the message LOCK_LOCKED, the message LOCK_MOV or the message LOCK_REQ_ACK.

In view of the reply generated by the previous lock owner, it is possible that a lock manager receives, in response to the message LOCK_REQ, more than one reply that is different to LOCK_REQ_ACK. If the first response is the message LOCK_LOCKED, the lock manager for example enters the WAIT state, and transitions again when the message LOCK_MOV is received. If however the first response is the message LOCK_MOV, the lock manager for example transitions to the state RESERVED or LOCKED, and ignores the other responses, although they are still read in order to empty the reception buffers 1116 of the lock manager.

A new type of message LOCK_REQ_ACK is for example used in this modified protocol, this message being sent by a lock manager that does not own a lock in order to acknowledge the request. In some cases, a timeout is set so that the message LOCK_REQ is retransmitted if a response has not been received from all of the lock managers within a certain time delay. In such a case, with respect to the previous protocol described above, the message LOCK_MOV_ACK can be omitted, and the "old" field in each lock entry can also be omitted. Furthermore, with respect to the previous protocol, the message LOCK_MOVED can be omitted.

The following table for example indicates the new list of messages and an example of the distribution of these messages among the three channels.

TABLE 3

| Channel Name | Messages | Description |
| --- | --- | --- |
| Response | LOCK_ERR<br>LOCK_INIT_ACK<br>LOCK_REQ_ACK<br>LOCK_NEXT_ACK | This channel is for example used to transmit messages that do not directly result in the generation of new reply messages |
| Request | LOCK_REQ<br>LOCK_MOV_ACK<br>LOCK_INIT<br>LOCK_DEL | This channel is used for broadcast messages. |
| Move | LOCK_MOV<br>LOCK_NEXT_CLUSTER<br>LOCK_LOCKED | This channel is used for intermediate messages that may result in another message, except for the message LOCK_LOCKED which is placed in the same channel as the message LOCK_MOV to prevent the order of arrival of these messages being altered |

The operation of the compute logic block 1104 for implementing the modified protocol is for example the same as that described in relation with FIG. 12 above, except that an addition internal transition H in the PENDING state, represented by a dashed arrow in FIG. 12, occurs when either:

the message LOCK_REQ_ACK is received and the number of received LOCK_REQ_ACK messages is greater than Nb_LM-2, where Nb_LM is the number of lock managers, the response being to send the message LOCK_REQ; or the message LOCK_REQ_ACK is received and the number of received LOCK_REQ_ACK messages is less than Nb_LM-2, the response being to increment a counter of the number of received LOCK_REQ_ACK messages.

Furthermore, the transitions represented by the arrows "3", "6", "8" and "11" are modified as follows with respect to the above description of FIG. 12, the other transitions for example being the same.

The transition of arrow "3" from the NO INIT state to the FREE state occurs if the message LOCK_INIT is received. In response, the "owner" field is set to false.

The transition of the arrow "6" from the PENDING state to the LOCKED state occurs if the message LOCK_MOV is received. In response, the fairness counter is decremented, the "owner" field is set to true, the message LOCK_MOV_ACK is sent, and a response to the processing thread is generated to inform the processing thread that the lock is locked.

The transition of the arrow "8" from the state WAIT to a state RESERVED occurs if the message LOCK_MOV is received. In response, the "owner" field is set to true, the "waiting" field is set to false, the message LOCK_MOV_ACK is sent, and a CPU interrupt is for example asserted.

The transition of the arrow "11" from the state TRANSFER to the state FREE for example occurs if the message LOCK_MOV_ACK has been received, the message LOCK_NEXT_ACK has been received in response to each transmitted message LOCK_NEXT_CLUSTER, and there is a lock manager in the waiting list. In response, the "owner" and "old" fields are set to false.

An advantage of the embodiments described herein is that a decentralized lock management system is implemented in which the lock management involves relatively few message transmissions between lock managers, thereby leading to a relatively low communications burden on the network. For example, the decentralization of the lock management permits information of the state of a lock to be obtained in only two network requests, compared to at least three in the prior art.

Furthermore, the protocol described herein based on a fairness counter and lock waiting list, which favors a lock being reused by a processing thread of the processing device associated with the lock manager that owns the lock over a transfer of the lock, leads to an overall reduction in the number of lock transfers, and thus a gain in performance. In the case that one or more of the processing devices corresponds to a cluster of processors sharing a same lock manager, it has been found that the probability of reuse of a lock by a processor in a same cluster is relatively high, leading to a further reduction in the number of lock transfers.

Various embodiments and variants have been described. Those skilled in the art will understand that certain features of these embodiments can be combined and other variants will readily occur to those skilled in the art. For example, it will be apparent to those skilled in the art that while two protocols have been described in detail by way of example, there are modifications that could be applied to these protocols, and these protocols could be adapted to create new protocols.

Furthermore, a function of task migration between processing devices could be implemented using one or more further message types, allowing lock ownership to transfer when the corresponding processing thread using the lock migrates.

The invention claimed is:

1. A multi-core architecture comprising:
   a plurality of processing devices, each processing device comprising a single processor or a cluster of processors; and
   a plurality of lock managers, each lock manager being associated with a corresponding one of the processing devices, each lock manager being configured to:
      store a first data value indicating whether or not it currently owns a first lock, the first lock authorizing access to a resource; and
      permit an owner of the first lock to be determined by one or more other lock managers of the plurality of lock managers by broadcasting, over an interconnection network to each of the other lock managers, at least one message.

2. The multi-core architecture of claim 1, wherein the message broadcast to each of the other lock managers is either: a message indicating that ownership of the first lock has or will move to another processing device; or a message requesting ownership of the first lock.

3. The multi-core architecture of claim 1, wherein each lock manager comprises a lock manager circuit comprising a logic circuit implementing a finite state machine.

4. The multi-core architecture of claim 3, wherein each lock manager further comprises a memory storing a table having an entry associated with the first lock, the entry including the first data value.

5. The multi-core architecture of claim 3, wherein each lock manager is partially implemented by one or more software modules providing an interface between a user application and the lock manager circuit.

6. The multi-core architecture of claim 1, wherein the interconnection network is a network-on-chip.

7. The multi-core architecture of claim 6, wherein the interconnection network is a 2D mesh implementing x-first message routing.

8. The multi-core architecture of claim 1, wherein the lock managers are configured to transmit messages to each other over the interconnection network on at least three separate channels.

9. The multi-core architecture of claim 1, wherein at least one of the plurality of processing devices is a cluster of two or more processors sharing one of said lock managers.

10. The multi-core architecture of claim 1, wherein each lock manager is configured to transmit over the interconnection network some or all of the following messages to one or more other lock managers:
    a lock initiation broadcast message;
    a lock initiation acknowledgement message;
    a lock deletion message;
    a lock request message or a lock request broadcast message;
    a lock request acknowledgement message acknowledging receipt of the lock request message;
    a lock move message indicating when a lock has or will be moved to another lock manager;
    a lock move acknowledgement message acknowledging receipt of the lock move message;
    a lock denied message indicating that a lock is in use and cannot be transferred; and
    a lock moved message indicating that responsibility for a lock has been entirely transferred from one lock manager to another lock manager.

11. The multi-core architecture of claim 1, wherein the lock managers are configured to store a distributed waiting list for lock ownership.

12. The multi-core architecture of claim 1, wherein a processing thread executed by a first of the processing devices is only permitted to modify a lock when it is owned by the lock manager associated with the first processing device.

13. A method of lock management in a multi-core architecture comprising a plurality of processing devices, each processing device comprising a single processor or a cluster of processors, the method comprising:
- storing, by each of a plurality of lock managers, each lock manager being associated with a corresponding one of the plurality of processing devices, a first data value indicating whether or not the lock manager storing the first data value currently owns a first lock, the first lock authorizing access to a resource; and
- broadcasting, by one lock manager over an interconnection network to each of the other lock managers, at least one message permitting a current owner of the first lock to be identified.

14. The method of claim 13, wherein the message broadcast to each of the other lock managers is either: a message indicating that ownership of the first lock has or will move to another processing device; or a message requesting ownership of the first lock.

15. The method of claim 13, further comprising:
- initiating a new lock by a first of the lock managers; and
- broadcasting, by the first lock manager, a lock initiation message to each of the other lock managers informing them of the initiation of the new lock.

* * * * *